United States Patent [19]
Ohashi et al.

[11] 3,911,545
[45] Oct. 14, 1975

[54] HOB FOR MACHINING GEAR WHEELS

[75] Inventors: Tsuyoshi Ohashi, Kobe; Hiroshi Taniguchi, Kakogawa; Koichiro Wakihira, Kobe; Kunio Kakihara, Akashi, all of Japan

[73] Assignee: Kobe Steel Ltd., Japan

[22] Filed: July 5, 1973

[21] Appl. No.: 376,366

Related U.S. Application Data

[63] Continuation-in-part of Ser. No. 235,166, March 16, 1972, abandoned.

[30] Foreign Application Priority Data
Mar. 16, 1971 Japan.............................. 46-14620

[52] U.S. Cl................................................ 29/103 B
[51] Int. Cl............................................... B26d 1/12
[58] Field of Search...... 29/103 B, 103, 103 C, 105; 76/DIG. 5

[56] References Cited
UNITED STATES PATENTS

| | | | |
|---|---|---|---|
| 1,393,818 | 10/1921 | Olson .............................. | 29/103 B |
| 1,512,798 | 10/1924 | Ramsay et al..................... | 29/103 B |
| 1,648,470 | 11/1927 | Anderson............................. | 29/103 |
| 1,812,811 | 6/1931 | Strauss............................. | 76/DIG. 5 |
| 2,869,218 | 1/1959 | Lindner............................. | 29/103 B |
| 3,374,518 | 3/1968 | Bentjens............................. | 29/103 B |
| 3,766,618 | 10/1973 | Janninck............................. | 29/103 |

*Primary Examiner*—J. M. Meister
*Assistant Examiner*—W. R. Briggs
*Attorney, Agent, or Firm*—Oblon, Fisher, Spivak, McClelland & Maier

[57] ABSTRACT

A hob for machining the teeth of gear wheels having tooth elements arranged in succession along a helical line of revolution positioned about its axis, wherein the tooth elements are classified into two types, one for cutting the faces and flanks of the teeth of a gear wheel to be produced and the other for cutting the bottoms of the teeth of the gear wheel, in order to avoid interference of the shavings produced by cutting of the flanks and the shavings produced by cutting of the bottoms, and thus to prevent the occurrence of such vibration of the tooth elements which normally is caused by fluctuation of the cutting resistance due to such interference by the shavings, and in which the two types of tooth elements are formed of different materials for respectively resisting wear and preventing chipping thereof.

10 Claims, 9 Drawing Figures

HOB FOR MACHINING GEAR WHEELS

This application is a continuation-in-part application of U.S. application Ser. No. 235,166 filed Mar. 16, 1972, now abandoned and the same is incorporated herein by reference.

BACKGROUND OF THE INVENTION

1. Field of the Invention

This invention relates generally to the machining of teeth of gear wheels by the generation method, and more particularly to an improved hob for milling or cutting teeth in a gear wheel.

2. Description of the Prior Art

Ordinarily, hobs for machining the teeth of gear wheels may have a variety of tooth shapes according to the particular conditions for which the teeth of the gear wheels are to be adapted, but generally, the hobs are screwed milling cutters having the teeth of a rack of an involute gear tooth. When a gear wheel is machined by a hob of this kind in a so-called generating action, the faces and/or flanks and the bottoms of the teeth of the gear wheel being produced are simultaneously cut by the tooth elements of the hob.

In this case, the shavings being produced by the cutting of the flanks interfere with the shavings being produced by the cutting of the bottoms of the teeth in the region of transfer therebetween, whereby the cutting edges of the tooth elements of the hob are subject to a fluctuating load, and therefore, the tooth elements are subject to a vibration due to this fluctuating cutting resistance. If vibration occurs, the tooth elements of the hob are rapidly worn due to the progress of wear through pitching and interference of the cutting edges with the shavings, and there is even a danger that the tooth elements may be nicked or broken, whereby the lifetime of the hob is shortened.

SUMMARY OF THE INVENTION

Accordingly, it is an object of the present invention to provide a long lasting hob by eliminating vibration of the tooth elements in cutting operations and thereby reducing the wearing of the cutting edges of the tooth elements as well as avoiding the likelihood of nicking or breakage of the tooth elements.

Another object of this invention is to provide a hob for precision machining of the teeth of gear wheels by substantially avoiding vibration of the tooth elements of the hob during a cutting operation.

These and other objects are accomplished, according to this invention, through the provision of a hob having tooth elements arranged in succession along a helical line of revolution positioned around its axis, wherein the tooth elements thereof are classified into two types, one for cutting the faces and flanks of the teeth of a gear wheel to be produced and the other for cutting the bottoms of the teeth of the gear wheel.

The tip edge portions of the tooth elements of the first type adapted to cut the faces and flanks of the teeth of a gear wheel are each eliminated or removed so as not to be engaged in the cutting operation of the bottoms of the teeth, while the side edge portions of the tooth elements of the second type adapted to cut the bottoms of the gear wheel teeth are each eliminated or removed so as not to be engaged in the cutting operation of the faces and flanks of the teeth. By this arrangement, the shavings from the bottom portions of the gear wheel teeth are prevented from interfering with those from the faces and flanks of gear wheel teeth, and thus, the occurrence of vibration of the tooth elements due to such interference of the shavings is avoided.

Further, the tooth elements of the first type for cutting the faces and flanks of the gear teeth are formed of a wear resisting material for reducing wearing thereof, while the tooth elements of the second type for cutting the bottoms of the gear teeth are formed of a ductile material for reducing the likelihood of chipping of the tooth elements.

The hobs according to this invention may conveniently be constituted as an assembled hob, if desired, wherein each or a group of the tooth elements are separately prepared and assembled on a body of the hob according to a prescribed arrangement of the tooth elements of the first and second types.

BRIEF DESCRIPTION OF THE DRAWING

Various other objects, features and attendant advantages of the present invention will be more fully appreciated as the same becomes better understood from the following detailed description when considered in conjunction with the accompanying drawings, in which like reference numerals designate like or corresponding parts throughout the several FIGURES, and wherein.

DESCRIPTION OF THE ILLUSTRATED EMBODIMENTS

Figure 1:
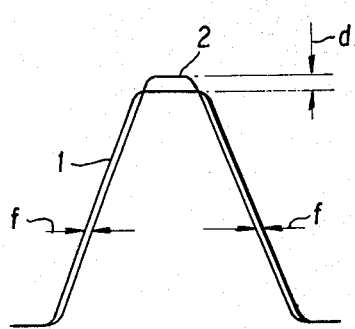
FIG. 1 shows a comparison of two types of tooth elements formed according to the present invention, one being for cutting the faces and flanks of gear wheel teeth and the other being for cutting the bottoms of the teeth of a gear wheel.

Referring now to the drawings, and more particularly to FIG. 1, the hobs according to this invention may be comprised of tooth elements of two types, namely, tooth element 1 for cutting the faces and flanks of the teeth of a gear wheel to be produced and tooth element 2 for cutting the bottoms of the gear wheel teeth. For such separate cutting purposes, an amount $d$ of the tip portion of the tooth element 1 is eliminated or removed, so that the tip portion thereof is not engaged during a cutting operation, while an amount $f$ is eliminated or removed from the opposite side portions of the tooth elements 2, so that the side portions thereof are not engaged during a cutting operation.

Figure 2:
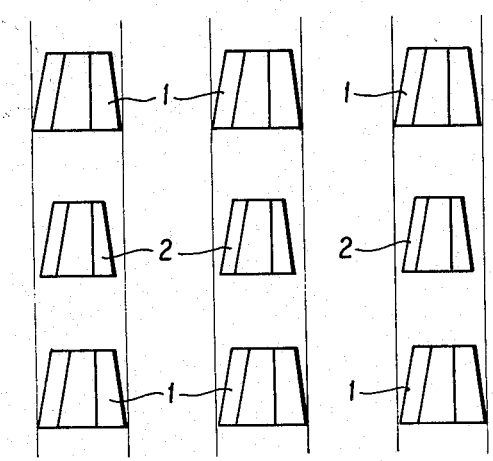
FIGS. 2 and 3 show, respectively, schematical developments of the tooth elements of the hobs according to this invention.

FIG. 2 shows an example of one arrangement of the tooth elements 1 and 2, wherein the tooth elements 1 and 2 are positioned alternately along the helical line of the hob so that the cutting of the faces and flanks and the cutting of the bottoms of the teeth of a gear wheel are alternately done in the course of a cutting operation.

Figure 3:
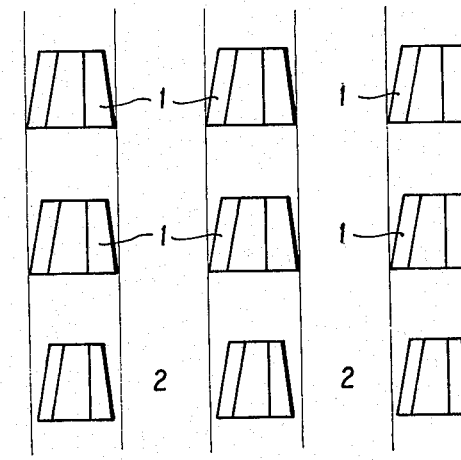

FIG. 3 shows an example of another arrangement of the tooth elements along the helical line of a hob according to this invention, wherein each tooth element 2 for cutting the bottoms of the teeth of a gear wheel is positioned following each two tooth elements 1 for cutting the faces and flanks of the gear wheel teeth, considering the fact that the cutting amount for the faces and flanks is generally much larger than the cutting amount for the bottoms thereof.

Figure 4:
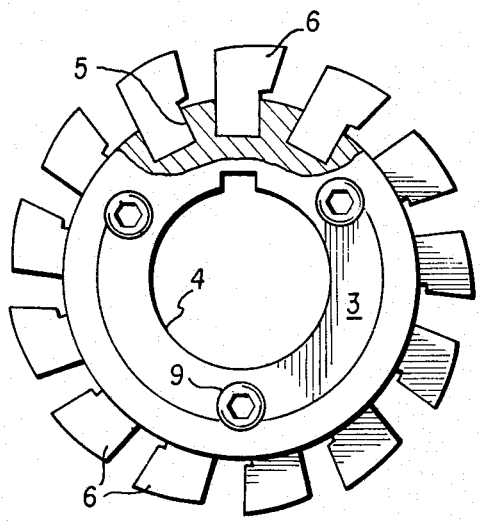
FIGS. 4 and 5 are, respectively, an end and a side view of an assembled hob with a portion thereof being broken away for the purpose of illustration.
Figure 5:
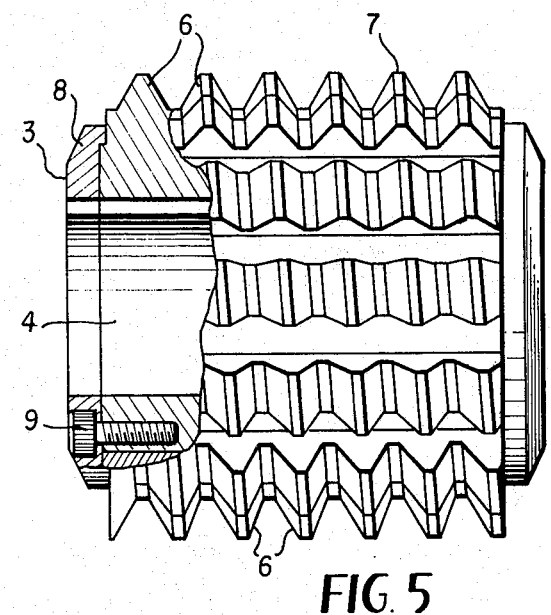

In FIGS. 4 and 5, an assembled hob of a type which can conveniently embody the idea of this invention is shown, wherein the reference numeral 3 designates a cylindrical body of a hob being formed with a central or axial bore 4 and grooves 5 in its peripheral portion being parallel to the axis thereof. Secured or planted in these grooves 5 are segments 6, each including a plurality of tooth elements 7. The segments 6 are clamped to the body 3 by an end ring 8, which is fastened to the body 3 by bolts 9.

Figure 6:
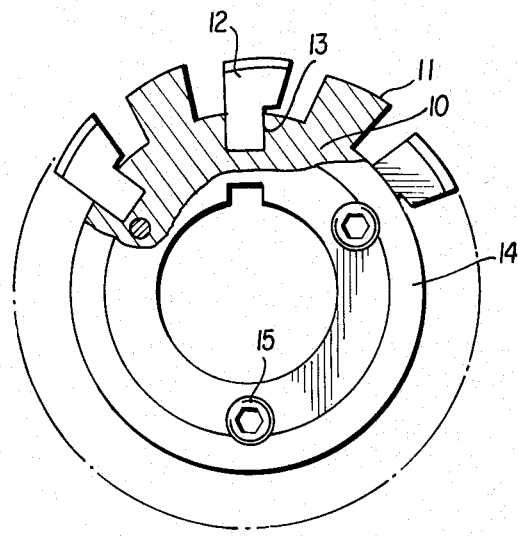
FIG. 6 is a view similar to that of FIG. 4, but showing a modification thereof.

FIG. 6 shows a modified version of the assembled hob shown in FIGS. 4 and 5, in this case, the hob body 10 being formed to include integral tooth elements 11 arranged with a peripheral pitch which is two times the final peripheral pitch of the tooth elements, and having tooth elements 12 planted in grooves 13 provided between each two otherwise adjacent integral tooth elements 11. The planted tooth elements 13 may be provided on segments, as shown in FIG. 5, which may be clamped to the body 10 by bolts 15.

Figure 7A:
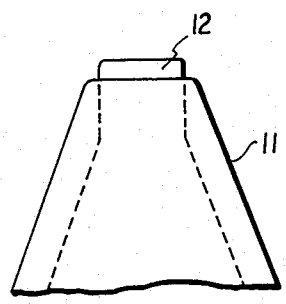
FIGS. 7a, 7b and 7c show several arrangements of the two types of tooth elements.
Figure 7B:
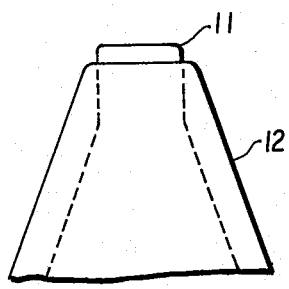

In the case of an assembled hob of the type shown in FIG. 6, the integral tooth elements 11 may be formed as the tooth elements for cutting the faces and flanks of the teeth of a gear wheel, while the planted tooth elements 12 are formed as the tooth elements for cutting the bottoms of the gear wheel teeth, as schematically illustrated in FIG. 7a. Or otherwise, if desired, the integral tooth elements 11 may be formed as the tooth elements for cutting the bottoms of the gear wheel teeth, while the planted tooth elements 12 are formed as the tooth elements for cutting the faces and flanks of the teeth of the gear wheel, as schematically illustrated in FIG. 7b.

Figure 7C:
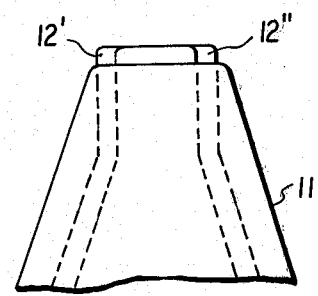

FIG. 7c shows a still further modification of the arrangement of the tooth elements embodied by this invention, wherein the integral tooth elements 11 are formed as the tooth elements for cutting the faces and flanks of the gear wheel teeth and the planted tooth elements are classified into two types designated by 12' and 12" for cutting substantially a leading portion of the bottom of the gear wheel teeth and for cutting substantially a trailing portion of the bottom thereof, respectively. The tooth elements 12' and 12" may be alternately positioned in a series of the planted tooth elements. In this case, the cutting of the leading or trailing portions of the bottoms of the gear wheel teeth occurs once during each three times of cutting by a series of the tooth elements. Therfore, it will be appreciated that this arrangement of the tooth elements substantially corresponds to the arrangement shown in FIG. 3.

In order to reduce the wear of the tooth elements of the hob of this invention which are designed for cutting the faces and flanks of the gear teeth, these tooth elements are preferably formed of a wear resisting material, and since the tip portions of the tooth elements for cutting the bottoms of the gear teeth may be inclined to chip, they are formed of a ductile material. Some materials which have been determined to be suitable for these purposes are disclosed in the following exemplary embodiments.

EXAMPLE 1

Material of the tooth elements for cutting the faces and flanks of the gear wheels: Cemented Carbide Alloy of Tip, the chemical composition of which is;

| | | |
|---|---|---|
| W | 78 to 85% | |
| Ti | 3 to 6% | |
| Co | 6 to 8% | "S3" according to Japanese Industrial Standards (J.I.S.) |
| C | 5 to 7% | |

Material of the tooth elements for cutting the bottoms of the gear wheels: High Speed Tool Steel, the chemical composition of which is;

| | | |
|---|---|---|
| W | 5.50 to 6.70% | |
| Mo | 4.50 to 5.50% | "SKH9" according to J.I.S. which approximately corresponds to "M2" of A.I.S.I. |
| Cr | 3.80 to 4.50% | |
| V | 1.60 to 2.20% | |
| C | 0.80 to 0.90% | |
| trifle amounts of Si, Mn, P, and S. | | |
| Fe | — balance | |

EXAMPLE 2

Material for the cutters of the faces and the flanks is a high speed tool steel, the chemical composition of which is;

| | | |
|---|---|---|
| W | 9.00 to 11.00% | |
| Mo | 3.00 to 4.00% | |
| V | 3.00 to 3.70% | "SKH57" according to J.I.S. |
| Co | 9.00 to 11.00% | |
| Cr | 3.80 to 4.50% | |
| C | 1.15 to 1.30% | |
| trifle amounts of Si, Mn, P, and S. | | |
| Fe | — balance | |

Material for the cutters of the bottoms of the gear wheels is "SKH9" according to J.I.S., which approximately corresponds to "M2". (See Example 1)

EXAMPLE 3

Material for the cutters of the faces and the flanks of the gear is "SKH10" according to J.I.S., which approximately corresponds to "T15" of A.I.S.I., the chemical composition of this material is;

| | |
|---|---|
| W | 11.50 to 13.50% |
| Co | 4.20 to 5.20% |
| V | 4.20 to 5.20% |
| Cr | 3.80 to 4.50% |
| C | 1.45 to 1.60% |
| trifle amounts of Si, Mn, P, and S. | |
| Fe | — balance |

Material for the cutters of the bottoms of the gear wheel is "SKH55" according to J.I.S., which approximately corresponds to "M35" of A.I.S.I., the chemical composition of this material is;

| | |
|---|---|
| W | 5.50 to 6.70% |
| Co | 4.50 to 5.50% |
| Mo | 4.80 to 6.20% |
| Cr | 3.80 to 4.50% |
| V | 1.70 to 2.30% |
| C | 0.80 to 0.90% |
| trifle amounts of Si, Mn, P, and S. | |
| Fe | — balance |

Obviously, many modifications and variations are possible in light of these teachings. It is to be understood, therefore, that within the scope of the appended claims, the invention may be practiced otherwise than as specifically described herein. Accordingly,

What is claimed as new and desired to be secured by Letters Patent of the United States is:

1. A hob for machining the teeth of gear wheels comprising:

a generally cylindrical body adapted for rotation about its longitudinal axis; and a plurality of tooth elements projecting from the periphery of said body being arranged in succession according to a preselected pattern along a helical line of revolution extending around said body about its axis, said tooth elements being classified into two types or sets and each set being formed of different materials, all of the teeth within a first one of said sets being identical to each other in size and profile while all of the teeth within a second one of said sets are also identical to each other in size and profile yet different from all of said teeth within said first set, said teeth within said first set having a width which is greater than the width of said teeth within said second set whereby only said teeth of said first set are utilized for cutting the faces and flanks of the teeth of a gear wheel to be produced, while said teeth within said second set have a height which is greater than the height of said teeth within said first set whereby only said teeth of said second set are utilized for cutting the bottoms of the teeth of said gear wheel.

2. A hob according to claim 1, wherein said one type of tooth elements for cutting the faces and the flanks of the teeth of a gear wheel are formed of a wear resisting material, and said other type of tooth elements for cutting the bottoms of the teeth of a gear wheel consist of a ductile material.

3. A hob according to claim 2, wherein said wear resisting material has a chemical composition of approximately:

| W | 78 to 85% |
|---|---|
| Ti | 3 to 6% |
| Co | 6 to 8% |
| C | 5 to 7% | and said ductile material has a chemical composition of approximately:

| W | 5.50 to 6.70% |
|---|---|
| Mo | 4.50 to 5.50% |
| Cr | 3.80 to 4.50% |
| V | 1.60 to 2.20% |
| C | 0.80 to 0.90% |
| trifle amounts of Si, Mn, P, and S. | |
| Fe | — balance. |

4. A hob according to claim 2, wherein said wear resisting material has a chemical composition of approximately:

| W | 9.00 to 11.00% |
|---|---|
| Mo | 3.00 to 4.00% |
| V | 3.00 to 3.70% |
| Co | 9.00 to 11.00% |
| Cr | 3.80 to 4.50% |
| C | 1.15 to 1.30% |

-Continued trifle amounts of Si, Mn, P, and S.
Fe — balance and said ductile material has a chemical composition of approximately:

| W | 5.50 to 6.80% |
|---|---|
| Mo | 4.50 to 5.50% |
| Cr | 3.80 to 4.50% |
| V | 1.60 to 2.20% |
| C | 0.80 to 0.90% |
| trifle amounts of Si, Mn, P, and S. | |
| Fe | — balance. |

5. A hob according to claim 2, wherein said wear resisting material has a chemical composition of approximately:

| W | 11.50 to 13.50% |
|---|---|
| Co | 4.20 to 5.20% |
| V | 4.20 to 5.20% |
| Cr | 3.80 to 4.50% |
| C | 1.45 to 1.60% |
| trifle amounts of Si, Mn, P, and S. | |
| Fe | — balance | and said ductile material has a chemical composition of approximately:

| W | 5.50 to 6.70% |
|---|---|
| Co | 4.50 to 5.50% |
| Mo | 4.80 to 6.20% |
| Cr | 3.80 to 4.50% |
| V | 1.70 to 2.30% |
| C | 0.80 to 0.90% |
| trifle amounts of Si, Mn, P, and S. | |
| Fe | — balance. |

6. A hob according to claim 1, wherein said two types of tooth elements are arranged alternately along said helical line of revolution.

7. A hob according to claim 1, wherein said tooth elements are arranged in a pattern so that a tooth element of the type for cutting the bottoms of the teeth is disposed between each two successive tooth elements of the type for cutting the faces and flanks of the teeth along the helical line of revolution.

8. A hob according to claim 1, wherein the type of said tooth elements for cutting the bottoms of the teeth are further classified into two additional types, one type being for substantially cutting the leading portion of the bottoms of said gear wheel teeth and the other type being for substantially cutting the trailing portion of the bottoms of said gear wheel teeth.

9. A hob according to claim 1, wherein said plurality of tooth elements are planted in said cylindrical body.

10. A hob according to claim 1, wherein the tooth elements of said two types of tooth elements are formed integrally with said cylindrical body, and the tooth elements of the other of said two types of tooth elements are planted in the cylindrical body.

* * * * *